(12) United States Patent
Langendijk et al.

(10) Patent No.: US 10,061,117 B1
(45) Date of Patent: Aug. 28, 2018

(54) ELECTROWETTING DISPLAY PIXEL WALLS AND SPACERS

(71) Applicant: AMAZON TECHNOLOGIES, INC., Seattle, WA (US)

(72) Inventors: Erno Hermanus Antonius Langendijk, Eindhoven (NL); Carmen Paula Alamar, Eindhoven (NL); Gerben Boon, Roermond (NL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 22 days.

(21) Appl. No.: 15/074,521

(22) Filed: Mar. 18, 2016

(51) Int. Cl.
*G02B 26/00* (2006.01)
*G02F 1/00* (2006.01)

(52) U.S. Cl.
CPC ................... *G02B 26/005* (2013.01)

(58) Field of Classification Search
CPC .... G02B 26/005; G02B 26/004; G02B 26/02; G02B 2207/115; G02B 5/201; G02B 26/08; G02B 5/0226; G02B 5/0242; G02B 5/3058

USPC ........ 359/237, 242, 265–267, 290–292, 295, 359/296, 298, 321, 315, 322

See application file for complete search history.

(56) References Cited

U.S. PATENT DOCUMENTS 9,684,161 B1 * 6/2017 Langendijk et al. ........................ G02B 26/005

* cited by examiner

*Primary Examiner* — Brandi Thomas
(74) *Attorney, Agent, or Firm* — Brinks Gilson & Lione (57) ABSTRACT

A display device includes a first support plate and an opposing second support plate. At least a portion of a wall on the first support plate is associated with a pixel within a pixel region. The wall has a first segment, a second segment perpendicular to the first segment, and a third segment perpendicular to the first segment and parallel to the second segment. A first spacer on the second support plate extends toward the wall. The first spacer includes a first portion contacting the wall along a length of the first segment, a second portion coupled to the first portion and contacting the second segment along a first portion of the second segment, and a third portion coupled to the first portion and contacting the third segment along a first portion of the third segment.

20 Claims, 7 Drawing Sheets

ELECTROWETTING DISPLAY PIXEL WALLS AND SPACERS

BACKGROUND

Electronic displays are found in numerous types of electronic devices including, without limitation, electronic book ("eBook") readers, mobile phones, laptop computers, desktop computers, televisions, appliances, automotive electronics, and augmented reality devices. Electronic displays may present various types of information, such as user interfaces, device operational status, digital content items, and the like, depending on the kind and purpose of the associated device. The appearance and quality of a display may affect a user's experience with the electronic device and the content presented thereon. Accordingly, finding ways to enhance user experience and satisfaction continues to be a priority. Moreover, increased multimedia use imposes high demands on designing, packaging, and fabricating display devices, as content available for mobile use becomes more extensive and device portability continues to be a high priority.

An electrowetting display includes an array of pixels individually bordered by pixel walls that retain fluid, e.g., a liquid such as an opaque oil, for example. Increased contact between a pixel wall and a respective spacer may maintain or improve performance and mechanical robustness of an electrowetting display panel. In at least some conventional electronic displays, inadequate spacers may allow the opposing support plates to move with respect to each other and, if such movement occurs at a high speed, considerable liquid flow between the plates may result, which may urge oil within one pixel to move to an adjacent pixel causing irreversible damage to the display panel.

BRIEF DESCRIPTION OF THE DRAWINGS

The detailed description is set forth with reference to the accompanying figures. The use of the same reference numbers in different figures indicates similar or identical items or features.

DETAILED DESCRIPTION

In example embodiments described herein, electronic devices, e.g., electrowetting display devices, include displays, e.g., electrowetting displays, that include spacers to provide a constant distance between a first or bottom support plate and a second or top support plate. The example spacers described herein provide: (a). optimal flow distribution for a fluid, e.g., a liquid electrolyte solution between adjacent pixel regions; (b). sufficient mechanical strength; and (c). improved confinement of oil within the associated pixel. In at least some conventional electrowetting display devices, the spacers are either full grid spacers or cross-spacers. Full grid spacers provide relatively high mechanical strength to maintain a desired distance between the support plates. However, the full grid spacers increase the difficulty of filling the pixel regions with fluids, e.g., an oil and a liquid electrolyte solution that is immiscible with the oil, without displacing or removing the oil from within the associated pixels. The full grid spacers also increase the difficulty of aligning and coupling the spacers to corresponding pixel walls. Conversely, cross-spacers are easier to fill with fluids, e.g., easier to limit or prevent oil displacement from within the associated pixels, than full grid spacers and easier to align and couple to corresponding pixel walls but conventional cross-spacers may not provide sufficient mechanical strength to maintain a desired distance between the support plates.

In example embodiments described herein, a spacer includes opposing spacer portions that are connected to a middle spacer portion to form an "H" or an "I" configuration to provide stability and sufficient strength when compared to conventional spacers and, at least partially because the spacers are separated by a distance from adjacent spacers along a respective segment of the pixel wall, the example spacers facilitate filling the associated pixel regions with the fluids. Moreover, the "H" or the "I" configuration of the example spacers prevent or limit undesirable movement of oil to adjacent pixel regions by confining the oil to a section, e.g., an oil collection area, of the associated pixel region. In certain embodiments, each example opposing spacer portion has a varying width along a length of the spacer portion to enhance or direct flow of the oil into the oil collection area of the associated pixel region, which further prevents or limits oil overflow as a pixel or a sub-pixel within the pixel region is activated to open. In these embodiments, the opposing portions may be mirror images of each other having the same dimensions along a length and/or a width of the portions. In further embodiments, a length of each opposing portion is adjusted to provide desired mechanical strength in order to withstand disruptive impact on the support plates, e.g., an impact on the supporting plate resulting from a substantial impact on one of the supporting plates. An orientation of each opposing portion with respect to the middle portion can also be adjusted to provide desired mechanical strength. For example, a length of a first leg of the portion positioned on a first side of the middle portion can be increased or decreased to decrease or increase, respectively, a length of a second leg of the portion positioned on a second side of the middle portion. In certain embodiments, the portions may have at least one side wall, e.g., an inner side wall facing an associated pixel region, and/or at least one corner that is arcuate or curved to facilitate oil flow into the oil collection area.

In various embodiments described herein, electronic devices, e.g., electrowetting display devices, include displays, e.g., electrowetting displays, for presenting content and other information. In some examples, the electrowetting display devices may include one or more components associated with the electrowetting display, such as a touch sensor component layered atop the electrowetting display for detecting touch inputs, a front light or a back light component for lighting the electrowetting display, and/or a cover layer component, which may have antiglare properties, antireflective properties, anti-fingerprint properties, anti-cracking properties, and/or the like. Various embodiments described herein include techniques for assembling electrowetting display devices including these components for the electrowetting displays and other features described herein.

An electrowetting pixel region includes a number of pixel walls that surround or are otherwise associated with at least a portion of the electrowetting pixel region, e.g., at least partially forming a pixel or a sub-pixel within the pixel region. The pixel walls form a structure that is configured to contain at least a portion of a first fluid, e.g., a liquid such as an opaque oil. Light transmission through the electrowetting pixel region can then be controlled by the application of an electric potential to the electrowetting pixel region, which results in a movement of a second fluid, e.g., a liquid such as an electrolyte liquid solution, into the electrowetting pixel, thereby displacing the first fluid. A pixel region may, unless otherwise specified, include an electrowetting element, one or more pixels, one or more pixels each including a plurality of sub-pixels, or one or more sub-pixels of an electrowetting display device, for example. Such an electrowetting element, pixel or sub-pixel may be the smallest light transmissive, reflective or transflective component of an electrowetting display that is individually operable to directly control an amount of light transmission through and/or reflection from the pixel region. For example, in some implementations, a pixel region may include a plurality of pixels, wherein each pixel includes a red sub-pixel, a green sub-pixel, a blue sub-pixel, and a white sub-pixel. In other implementations, a pixel region may include a plurality of pixels, wherein each pixel is a smallest component of the electrowetting display, i.e., the pixel does not include any sub-pixels.

As disclosed herein, a contact surface of a spacer is shaped and positioned to align with a cooperating or complementary contact surface of one or more segments of the pixel wall such that the contact between the contact surface of the spacer and the contact surface of the pixel wall provides a stable contact joint at an interface between the spacer and the pixel wall. The stable contact joint provides for improved mechanical strength at the interface and is less sensitive to overflow and/or leakage of liquid, e.g., leakage of oil, contained within the electrowetting pixel or sub-pixel. The contact surfaces of the pixel wall and the spacer may have various suitable surface features or configurations. In example embodiments, the spacer has a contact surface that contacts a corresponding contact surface of the pixel wall. In certain embodiments, the contact surface of the spacer is substantially identical to the contact surface of the pixel wall, e.g., the contact surfaces of the spacer and the pixel wall have complementary, identical surface areas. In the example embodiments, one or more portions, e.g., a first portion of the spacer, has a contact surface at a distance from and parallel to the second support plate, that contacts a corresponding segment of the pixel wall, e.g., at least a portion of a corresponding first segment of the pixel wall. In certain embodiments, one or more portions, e.g., opposing side portions, of the spacer may be asymmetric such that the contact surface of the spacer portion at a midline of the portion has a first width and the contact surface of the spacer portion at a terminal end at a distance from the midline has a second width different from the first width, i.e., less than or greater than the first width.

In a particular embodiment, a portion of the spacer has a base coupled to the second support plate and the opposing contact surface contacts the wall. In this embodiment, the base may have a first width, e.g., at the midline or at the terminal end of the portion, and the contact surface may have a second width different from the first width, i.e., less than or greater than the first width. For example, in one embodiment, opposing side portions of the spacer have a contact surface contacting a portion of a corresponding segment of the pixel wall. The contact surface of the spacer portions at the base of the spacer has a first width and the contact surface of the spacer portions has a second width less than the first width such that the spacer portions are tapered towards the corresponding segments of the pixel wall. In a particular embodiment, one or more portions of the spacer, e.g., the opposing side portions of the spacer, have an arcuate sidewall facing the associated pixel region to facilitate moving the oil toward an oil collection area of the pixel region.

In various embodiments, the pixel wall and the spacers at least partially define an associated electrowetting pixel region and/or one or more adjacent electrowetting pixel regions.

An electronic display device, such as an electrowetting display device, may have a transmissive, reflective or transflective display that generally includes an array of pixel regions (e.g., which may comprise pixels and/or sub-pixels) configured to be operated by an active matrix addressing scheme. For example, rows and columns of electrowetting pixel regions are operated by controlling voltage levels on a plurality of source lines and a plurality of gate lines. In this configuration, the electronic display device may produce an image by selecting particular pixel regions to transmit, reflect or block light. Pixel regions are addressed (e.g., selected) via rows of source lines and columns of gate lines that are electrically connected to transistors (e.g., used as switches) included in each pixel region. Transistors take up a relatively small fraction of the area of each pixel region to allow light to efficiently pass through (or reflect from) the pixel region.

Electrowetting displays include an array of pixel regions sandwiched between two support plates, such as a first or bottom support plate and a second or top support plate. For example, a bottom support plate in cooperation with a top support plate may contain pixel regions that include a liquid electrowetting oil, a liquid electrolyte solution, and one or more pixel walls between the support plates. The support plates may be made of a suitable glass, plastic, or other transparent material and may be rigid or flexible, for example. Generally, a material or layer is "transparent" if the material or layer transmits a relatively large fraction of the light incident upon it. For example, a transparent material or layer may transmit more than 70% and, more particularly, more than 80% of the light impinging on its surface, though claimed subject matter is not limited in this respect. The pixel regions include various layers of materials built on or over the bottom support plate. One example layer is an amorphous fluoropolymer (AF) with hydrophobic behavior, around portions of which pixel walls are built in certain embodiments.

Hereinafter, example embodiments include, but are not limited to, reflective electrowetting displays that include a clear or transparent top support plate and a bottom support plate, which need not be transparent, e.g., made of an opaque material. The transparent top support plate may be glass or any suitable transparent material, such as a transparent plastic, quartz, or semiconductor material, for example, and claimed subject matter is not limited in this respect. The terms "top" and "bottom" are generally used to identify the opposing support plates of an electrowetting display device, and do not necessarily refer to a direction referenced to gravity or to a viewing side of the electrowetting display device. Also, for the sake of convenience of describing example embodiments, the top support plate is the surface through which the pixel regions of a (reflective) electrowetting display are viewed.

In certain embodiments, individual reflective electrowetting pixel regions include a reflective layer on or over the bottom support plate, a transparent electrode layer adjacent to the reflective layer, and a hydrophobic layer on the electrode layer. The pixel walls of each pixel, the hydrophobic layer, and the transparent top support plate at least partially enclose a fluid region or cavity. Within the fluid region, a first fluid, e.g., an electrically non-conductive first liquid, such as an opaque oil, is retained in the individual electrowetting pixels by the pixel walls. A second fluid, e.g., a second liquid, overlies the first liquid and may overlie some of the pixel walls of the patterned pixel region grid. In certain embodiments, the second liquid is a liquid electrolyte solution that is electrically conductive or polar and may be a water or a salt solution, such as a solution of potassium chloride in water. The second liquid may be transparent, or may be colored or light-absorbing. The second liquid is immiscible with the first liquid. In general, substances are immiscible with one another if the substances do not substantially form a solution, although in a particular embodiment, the second liquid might not be perfectly immiscible with the first liquid. In general, an "opaque" liquid is a liquid that appears black to an observer. For example, an opaque liquid strongly absorbs a broad spectrum of wavelengths (e.g., including those of red, green and blue light) in the visible region of electromagnetic radiation appearing black. However, in certain embodiments, an opaque liquid may absorb a relatively narrower spectrum of wavelengths in the visible region of electromagnetic radiation and may not appear perfectly black.

In some embodiments, the opaque liquid is a nonpolar electrowetting oil. In certain embodiments, the first liquid may absorb at least a portion of the visible light spectrum. The first liquid may be transmissive for a portion of the visible light spectrum, forming a color filter. For this purpose, the first liquid may be colored by addition of pigment particles or a dye. Alternatively, the first liquid may be black, for example by absorbing substantially all portions of the visible light spectrum, or reflecting. A reflective first liquid may reflect the entire visible light spectrum, making the layer appear white, or a portion of the entire visible light spectrum, making the layer have a color. In example embodiments, the first liquid is black and, therefore, absorbs substantially all portions of an optical light spectrum, for example, in the visible light spectrum. The opaque liquid is disposed in the fluid region within individual pixels or sub-pixels. A coverage area of the opaque first liquid on the bottom hydrophobic layer is electrically adjustable to affect the amount of light incident on the reflective electrowetting display that reaches the reflective material at the bottom of each pixel or sub-pixel.

One or more spacers and one or more edge seals may also be located between the two support plates to at least partially enclose the fluid region. The spacers and the edge seals mechanically couple the first support plate with the opposing, overlying second support plate, and form a separation between the first support plate and the second support plate, as well as contribute to the mechanical integrity of the electrowetting display device. In example embodiments, the edge seals are disposed along a periphery of an array of electrowetting pixel regions, to facilitate retaining liquids (e.g., the first liquid and the second liquid) between the first support plate and the second support plate. The spacers can be at least partially transparent so as to not hinder throughput of light in the electrowetting display. The transparency of the spacers may at least partially depend on the refractive index of the spacer material, which in certain embodiments is similar to or the same as the refractive indices of surrounding media. The spacers may also be chemically inert to surrounding media.

In some embodiments, an electrowetting display as described herein may form a portion of a system that includes one or more processors and one or more computer memories, which may reside on a control board, for example. Display software may be stored on the one or more memories and may be operable with the one or more processors to modulate light that is received from an outside source (e.g., ambient room light) or out-coupled from a lightguide of the display device. For example, display software may include code executable by a processor to modulate optical properties of individual pixel regions of the electrowetting display based, at least in part, on electronic signals representative of a static image and/or video data. The code may cause the processor to modulate the optical properties of pixel regions by controlling electrical signals (e.g., voltages, currents, and fields) on, over, and/or in layers of the electrowetting display.

Figure 1:
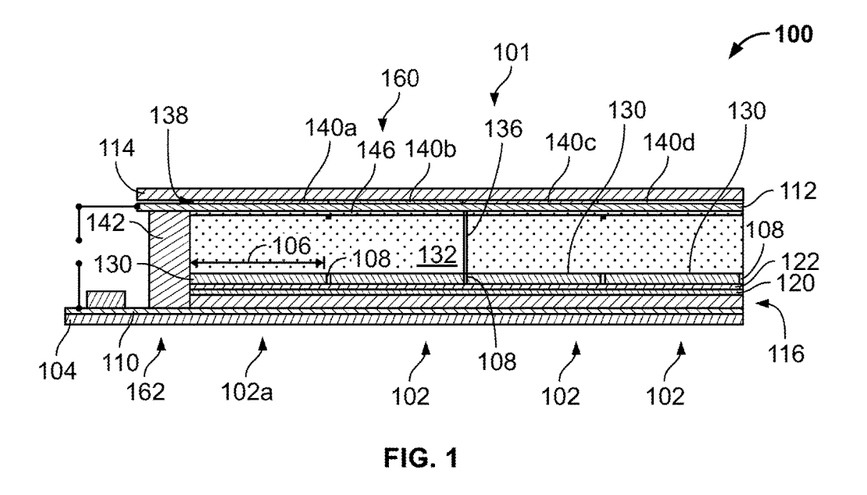
FIG. 1 is a cross-sectional view of an example electrowetting display device, according to an example embodiment.
Figure 2:
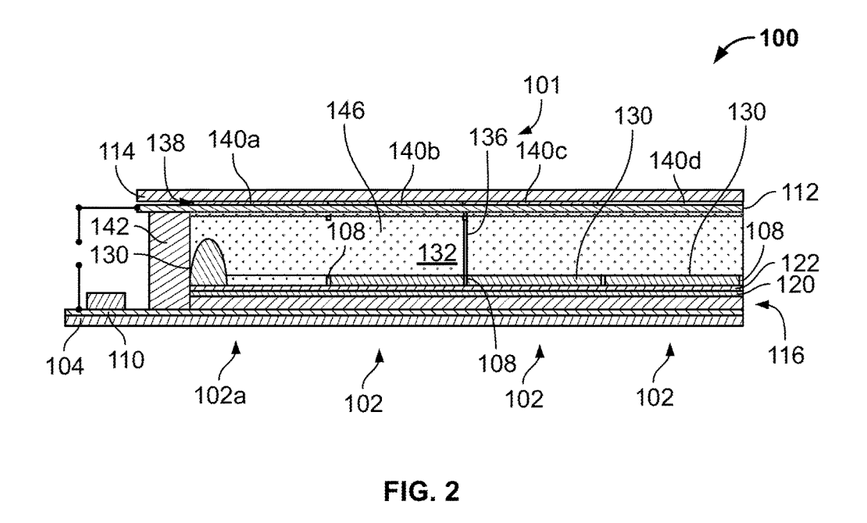
FIG. 2 is a cross-sectional view of the electrowetting display device of FIG. 1 with a first electrowetting pixel activated to expose at least a portion of a display area.
Figure 3:
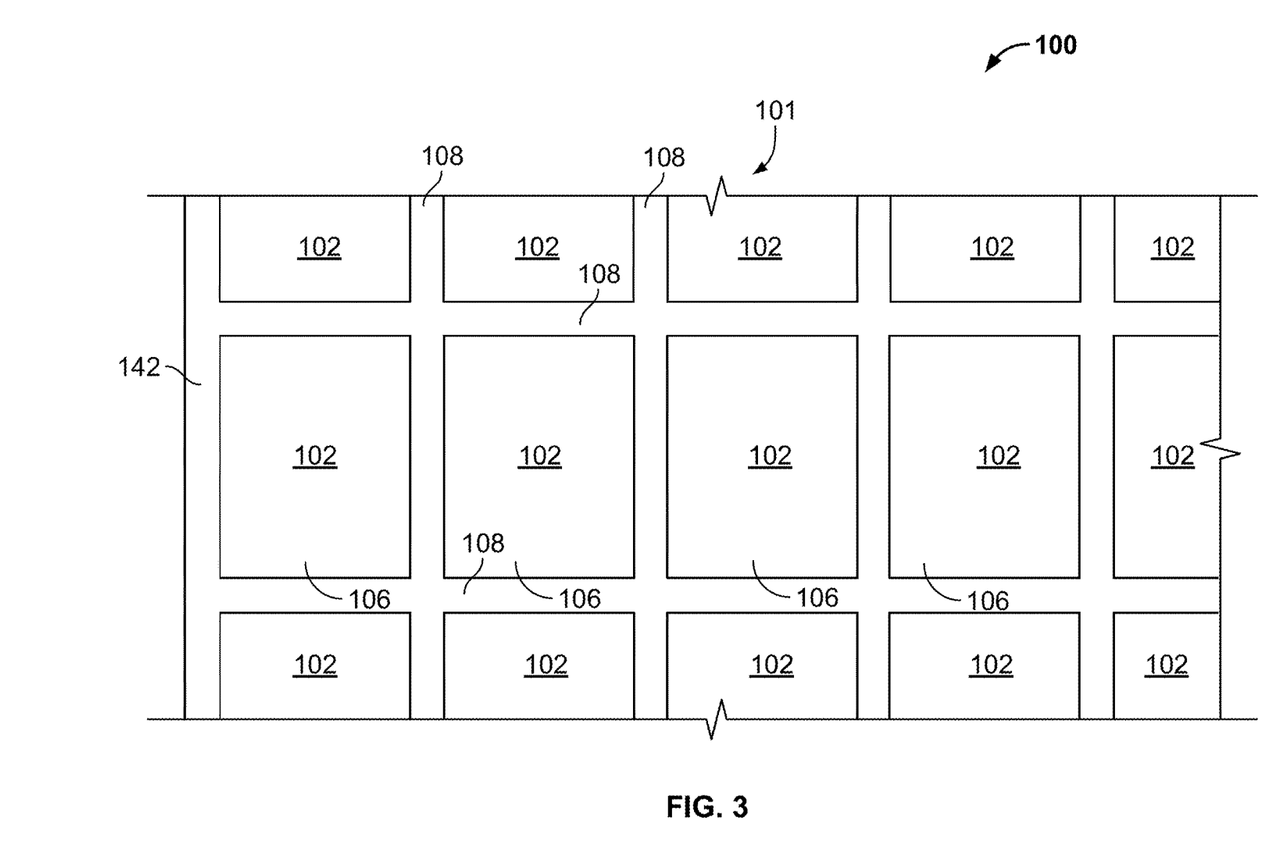
FIG. 3 is a top view of a plurality of electrowetting pixels of an example electrowetting display device.

Referring now to the figures, FIG. 1 is a cross-sectional view of a portion of an example reflective electrowetting display device 100 including a pixel grid 101 with several electrowetting pixels 102. FIG. 2 shows the same cross-sectional view as FIG. 1 in which an electric potential has been applied to one electrowetting pixel 102a causing displacement of a first liquid disposed in electrowetting pixel 102a, as described below. Four complete electrowetting pixels 102 are shown in cross-section in FIGS. 1 and 2. FIG. 3 is a top view of an example reflective electrowetting display device 100 including pixel grid 101 having a plurality of electrowetting pixels 102 formed over a first or bottom support plate 104 (shown in FIGS. 1 and 2). As shown in FIG. 3, each electrowetting pixel 102 defines a display surface area 106. More specifically, in this embodiment, display surface area 106 is defined by pixel walls 108, as described below, having a first dimension, such as a width, between opposing lateral pixel walls 108, and a second dimension, such as a length, between the remaining opposing pixel walls 108. Electrowetting display device 100 may include any number (usually a very large number, such as thousands or millions) of electrowetting pixels 102.

Referring further to FIGS. 1 and 2, an electrode layer 110 having a plurality of pixel electrodes is formed on bottom support plate 104 and between electrowetting pixels 102 and bottom support plate 104. Electrode layer 110 and/or the one or more pixel electrodes are operatively coupled to a second or common electrode 112 positioned under a second or top support plate 114 for creating, in conjunction with common electrode 112, a voltage differential between electrode layer 110 and common electrode 112 to cause displacement of the first liquid, e.g., an oil, within the associated electrowetting pixel 102. These example embodiments are not limiting with respect to the location of the first electrode and the second electrode, and claimed subject matter is not limited in this respect. In particular embodiments, one or more additional layers may be positioned between electrode layer 110 and bottom support plate 104, in which TFTs, gates, and/or source lines are located, for example. In these embodiments, electrode layer 110 may not be formed directly on bottom support plate 104. In various embodiments, electrode layer 110 may be connected to any number of transistors, such as suitable thin film transistors (TFTs) (not shown), that are switched to either select or deselect corresponding electrowetting pixels 102 using active matrix addressing, for example. A TFT is a particular type of field-effect transistor that includes thin films of an active semiconductor layer as well as a dielectric layer and metallic contacts over a supporting (but non-conducting) substrate, which may be glass or any suitable transparent or non-transparent material, for example.

A reflective layer 116 is positioned adjacent, e.g., on electrode layer 110, as shown in FIGS. 1 and 2, for example. In particular embodiments, one or more additional layers may be positioned between reflective layer 116 and electrode layer 110. In these embodiments, reflective layer 116 may not be formed directly on electrode layer 110. In an alternative embodiment, reflective layer 116 is positioned under a transparent electrode layer. In this alternative embodiment, reflective layer 116 is positioned between the transparent electrode layer 110 and bottom support plate 104. Reflective layer 116 may reflect light within the entire visible spectrum, making the layer appear relatively bright, or reflect a portion of light within the visible spectrum, making the layer have a color. In this embodiment, reflective layer 116 is positioned within the pixel region, e.g., within each electrowetting pixel 102, to provide specular reflection.

In example embodiments, reflective layer 116 is positioned on electrode layer 110 within electrowetting pixel 102 or, alternatively, on electrode layer 110 and under electrowetting pixel 102. In certain embodiments, reflective layer 116 is formed or made of any suitable materials including, for example, a metal (90%, 95% or greater than 95% metal), an alloy, a doped metal, or a dielectric reflector material. Suitable metal materials for reflective layer 116 include, without limitation, aluminum, silver, gold, copper, nickel, platinum, rhodium, lanthanum, and/or silicon nickel. Suitable alloy materials for reflective layer 116 include, without limitation, aluminum with copper or aluminum with nickel. In further alternative embodiments, reflective layer 116 is made of any suitable material providing a desired specular reflectance. In alternative embodiments, reflective layer includes a suitable diffuse reflective material deposited on or over electrode layer 110. In this alternative embodiment, any suitable diffuse reflective material, such as titanium dioxide ($TiO_2$), providing a desired diffuse reflectance may be used.

Electrowetting pixels 102 may have specific and/or additional structural features. Additionally or alternatively, reflective layer 116 may have structural features, for example, one or more relatively thinner areas and/or one or more relatively thicker areas within reflective layer 116 to control movement of the fluids. Alternatively, reflective layer 116 may be deposited on a structural feature conforming to a shape of the structural feature.

A suitable dielectric barrier layer 120 may at least partially separate electrode layer 110 from a hydrophobic layer 122, such as an amorphous fluoropolymer layer forming a bottom surface of electrowetting pixel 102 in certain embodiments. For example, dielectric barrier layer 120 may be deposited on reflective layer 116. Dielectric barrier layer 120 may be formed from various materials including one or more organic material layers or a combination of organic and inorganic material layers. A thickness of the insulating dielectric barrier layer 120 may be less than 2 micrometers and may be less than 1 micrometer; for example, the insulating dielectric barrier layer 120 may be 100 nanometers to 800 nanometers in thickness in certain embodiments. In some embodiments, hydrophobic layer 122 is an amorphous fluoropolymer layer including any suitable fluoropolymer(s), such as AF1600® fluoropolymer, produced by DuPont, based in Wilmington, Del. Hydrophobic layer 122 is transparent in the example embodiment. As described above, in certain embodiments, reflector layer 116 itself can act both as a pixel electrode and a reflector layer.

In the example embodiment, one or more pixel walls 108 form patterned electrowetting pixel grid 101 on hydrophobic layer 122. Pixel walls 108 may include a photoresist material such as, for example, epoxy-based negative photoresist SU-8. Patterned electrowetting pixel grid 101 includes a plurality of rows and a plurality of columns that form an array of electrowetting pixels, such as shown in FIG. 3, including a plurality of electrowetting pixels 102 that may have a width and a length in a range of about 50 to 500 micrometers, for example.

A first liquid 130, which may have a thickness (e.g., a height as shown in FIGS. 1 and 2 for example) in a range of about 1 micrometer to 10 micrometers, for example, overlays hydrophobic layer 122. First liquid 130 is partitioned by pixel walls 108 of patterned electrowetting pixel grid 101. A second liquid 132, such as an electrolyte solution, overlays first liquid 130 and, in certain embodiments, at least a portion of pixel walls 108 of patterned electrowetting pixel grid 101. In certain embodiments, as described above, second liquid 132 may be electrically conductive and/or polar. For example, second liquid 132 may be water or a water solution, or a salt solution such as a solution of potassium chloride in water or a mixture of water and ethyl alcohol. In certain embodiments, second liquid 132 is transparent, but may be colored or absorbing. First liquid 130 is electrically non-conductive and may, for example, be an alkane-like hexadecane or (silicone) oil. As described above, second liquid 132 is immiscible with first liquid 130.

As described above, hydrophobic layer 122 is arranged on or over bottom support plate 104 to create an electrowetting surface area. The hydrophobic character of hydrophobic layer 122 causes first liquid 130 to adjoin preferentially to hydrophobic layer 122 because first liquid 130 has a higher wettability with respect to a top surface of hydrophobic layer 122 than second liquid 132 in the absence of a voltage. Wettability relates to the relative affinity of a fluid, e.g., a liquid, for the surface of a solid. Wettability increases with increasing affinity, and it may be measured by the contact angle formed between the fluid and the solid and measured internal to the fluid of interest. For example, such a contact angle may increase from relative non-wettability for a contact angle of more than 90° to complete wettability for a contact angle of 0°, in which case the liquid tends to form a film on the surface of the solid.

Top support plate 114 covers second liquid 132 and one or more spacers 136 to maintain second liquid 132 over electrowetting pixel grid 101. In one embodiment, spacers 136 are positioned between top support plate 114 and pixel wall 108. In example embodiments, spacer 136 is coupled to and extends from top support plate 114 to contact a contact surface on a first or distal end of one or more corresponding pixel walls 108, as described in greater detail below. In certain embodiments, one or more components or layers may be positioned between top support plate 114 and spacers 136. In this arrangement, a contact surface of spacer 136 contacts a contact surface of corresponding pixel wall 1108 to provide a stable contact joint at an interface between pixel wall 108 and spacer 136, providing mechanical strength at the interface that is less sensitive to overflow and/or leakage of first liquid 130 and/or second liquid 132 contained within the pixel regions. In alternative embodiments, spacer 136 does not rest on pixel wall 108 but is substantially aligned with pixel wall 108. This arrangement may allow spacer 136 to come into contact with pixel wall 108 upon a sufficient pressure or force being applied to top support plate 114. Multiple spacers 136 may be interspersed throughout electrowetting pixel grid 101. In certain embodiments, one or more filter layers 138 including, for example, color filters 140a-140d as shown in FIGS. 1 and 2, may be positioned between second electrode 112 and top support plate 114. A seal 142 extends about a perimeter of electrowetting display device 100 to contain first liquid 130 and second liquid 132 within the fluid region of the cavity. A voltage applied across, among other things, second liquid 132 and electrode layer 110 of individual electrowetting pixels 102 controls transmittance or reflectance of the individual electrowetting pixels 102.

Reflective electrowetting display device 100 has a viewing side 160 corresponding to top support plate 114 through which an image formed by reflective electrowetting display device 100 may be viewed, and an opposing rear side 162 corresponding to bottom support plate 104 as shown, for example, in FIGS. 1 and 2. Reflective electrowetting display device 100 may be a segmented display type in which the image is built of segments. The segments may be switched simultaneously or separately. Each segment includes one electrowetting pixel 102 or a number of electrowetting pixels 102 that may be neighboring or distant from one another. Electrowetting pixels 102 included in one segment are switched simultaneously, for example. Electrowetting display device 100 may also be an active matrix driven display type or a passive matrix driven display, for example.

Figure 4A:
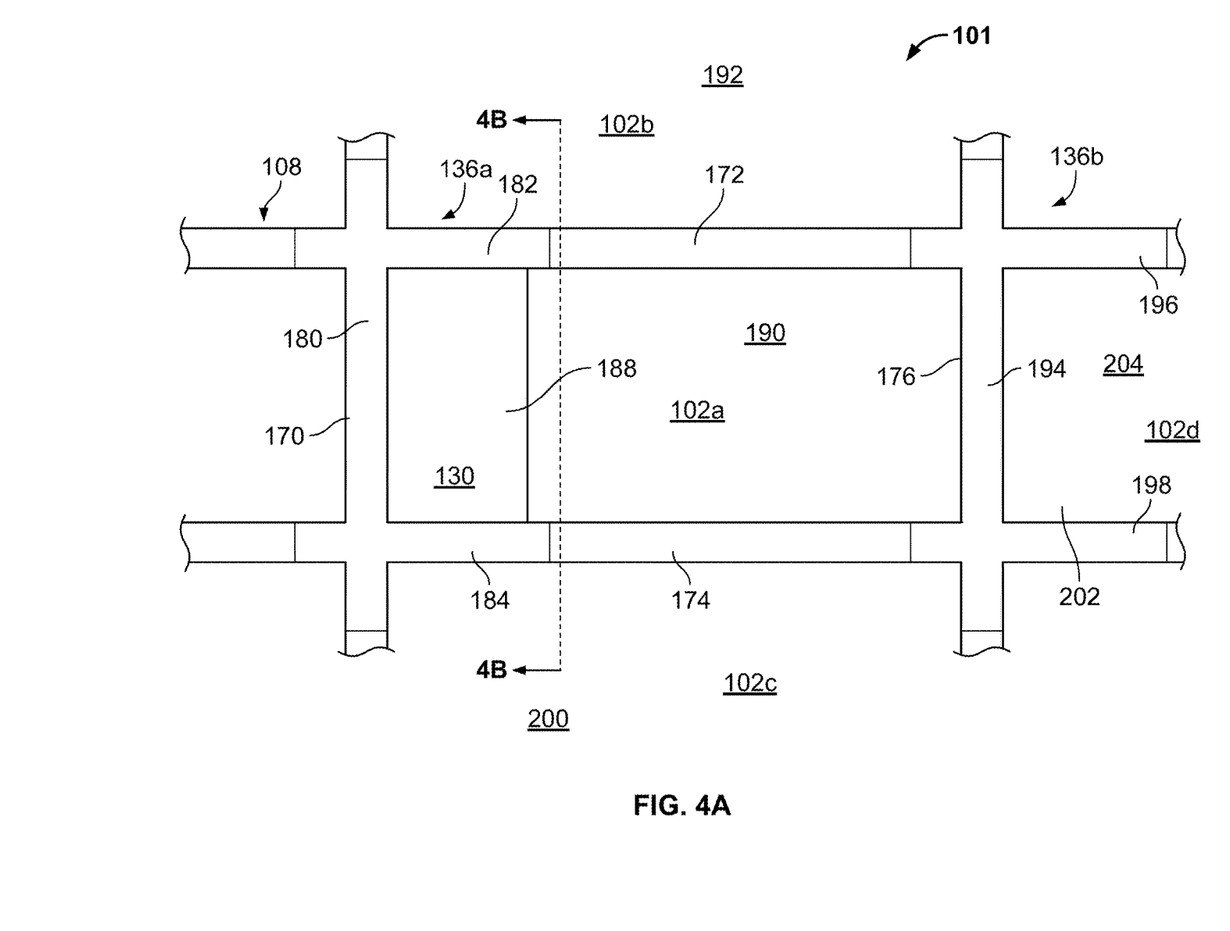
FIG. 4A is a top view of an electrowetting pixel region of an example electrowetting display device in an activated state with a first fluid displaced within an associated electrowetting pixel by a second fluid, according to an example embodiment.
Figure 4B:
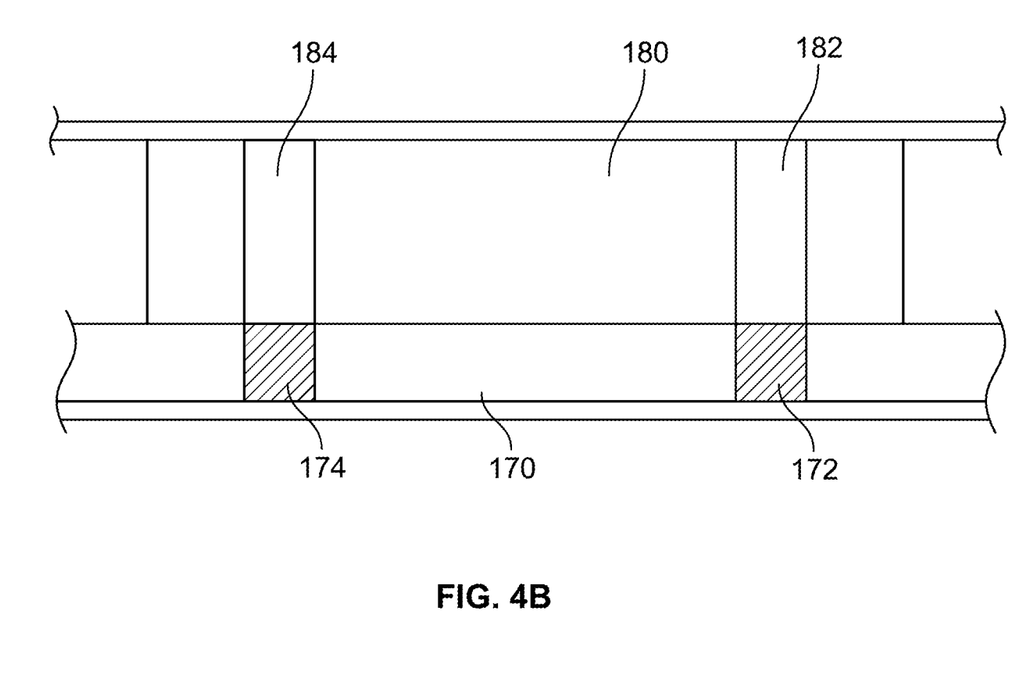
FIG. 4B is a cross-sectional view of the electrowetting pixel region shown in FIG. 4A along sectional line 4B-4B without fluid in the electrowetting pixel region.

FIG. 4A is a top view of an electrowetting pixel region of an example electrowetting display device in an activated state with a first fluid displaced within an associated electrowetting pixel by a second fluid, according to an example embodiment. FIG. 4B is a cross-sectional view of the electrowetting pixel region shown in FIG. 4A along sectional line 4B-4B without fluid in the electrowetting pixel region. Referring further to FIG. 4A, in certain embodiments, one or more pixel walls 108 are formed on bottom support plate 104 to form a perimeter of one or more electrowetting pixels 102. A portion of pixel wall 108 as shown in FIG. 4A forms electrowetting pixel 102a, at least a portion of electrowetting pixel 102b, at least a portion of electrowetting pixel 102c, and at least a portion of electrowetting pixel 102d. Pixel wall 108 includes a first segment 170, a second segment 172 perpendicular to first segment 170, a third segment 174 perpendicular to first segment 170 and parallel to second segment 172, and a fourth segment extending between second segment 172 and third segment 174 and being parallel to first segment 170. First segment 170 has a length extending between second segment 172 and third segment 174. Fourth segment 176 of pixel wall 108 extends between second segment 172 and third segment 174. Fourth segment 176 is opposite first segment 170 and parallel to first segment 170. In this embodiment, fourth segment 176 has a length equal to the length of first segment 170. First segment 170, second segment 172, third segment 174 and fourth segment 176 are coupled together to form pixel wall 108 of electrowetting pixel 102a.

In example embodiments, at least one spacer 136 is coupled to pixel wall 108. For example, a first spacer 136a is coupled to top support plate 114 (not shown in FIG. 4A for clarity) and extends from top support plate 114 to contact pixel wall 108. In example embodiments, first spacer 136a includes a first portion 180 contacting pixel wall 108 substantially along the length of first segment 170. A second portion 182 of first spacer 136a is coupled to first portion 180 and extends along only a first portion of a length of second segment 172 from first segment 170 toward fourth segment 176 and substantially contacts second segment 172. A third portion 184 of spacer 136a is coupled to first portion 180 and extends along only a first portion of a length of third segment 174 from first segment 170 toward fourth segment 176. Third portion 184 substantially contacts third segment 174. First spacer 136a is coupled to pixel wall 108 to provide an oil collection area 188 within an electrowetting pixel region 190 including electrowetting pixel 102a. More specifically, first portion 180 is coupled along the length of first segment 170, second portion 182 is coupled along a portion of the length of second segment 172, and third portion 184 is coupled along a portion of the length of third segment 176 to provide oil collection area 188 within electrowetting pixel region 190 including electrowetting pixel 102a.

As shown in FIG. 4A, in an example embodiment, a second spacer 136b is coupled to top support plate 114 and spaced from first spacer 136a by a suitable distance to align with an opposing end of electrowetting pixel 102a. Second spacer 136b extends from top support plate 114 to substantially contact pixel wall 108 along a portion of second segment 172. As shown in FIG. 4A, second spacer 136b is separated by a distance from first spacer 136a along second segment 172 to provide fluid communication between electrowetting pixel region 190 and a first immediately adjacent electrowetting pixel region 192. More specifically, second spacer 136b includes a first portion 194 contacting pixel wall 108 substantially along the length of fourth segment 176. A second portion 196 of second spacer 136b is coupled to first portion 194 and extends along a second portion of the length of second segment 172 from fourth segment 176 toward first segment 170 and substantially contacts second segment 172. Second portion 196 of second spacer 136b is separated by a distance from second portion 182 of first spacer 136a along the length of second segment 172 to allow second liquid 132 to move between electrowetting pixel region 190 and first immediately adjacent electrowetting pixel region 192. A third portion 198 of second spacer 136b opposite second portion 196 is coupled to first portion 194 and extends along a second portion of the length of third segment 174 from fourth segment 176 toward first segment 170. Third portion 198 substantially contacts third segment 174 of pixel wall 108 along the second portion of the length of third segment 174. Third portion 198 of second spacer 136b is separated by a distance from third portion 184 of first spacer 136a along third segment 174 to allow second liquid 132 to move between electrowetting pixel region 190 and a second immediately adjacent electrowetting pixel region 200 shown in FIG. 4A. Second spacer 136b is coupled to pixel wall 108 to provide an oil collection area 202 within a third immediately adjacent pixel region 204 including electrowetting pixel 102d. More specifically, first portion 194 is coupled substantially along the length of fourth segment 176, second portion 196 is coupled along a portion of the length of second segment 172, and third portion 198 is coupled along a portion of the length of third segment 176 to provide oil collection area 202 within electrowetting pixel region 204 including electrowetting pixel 102d.

Figure 5:
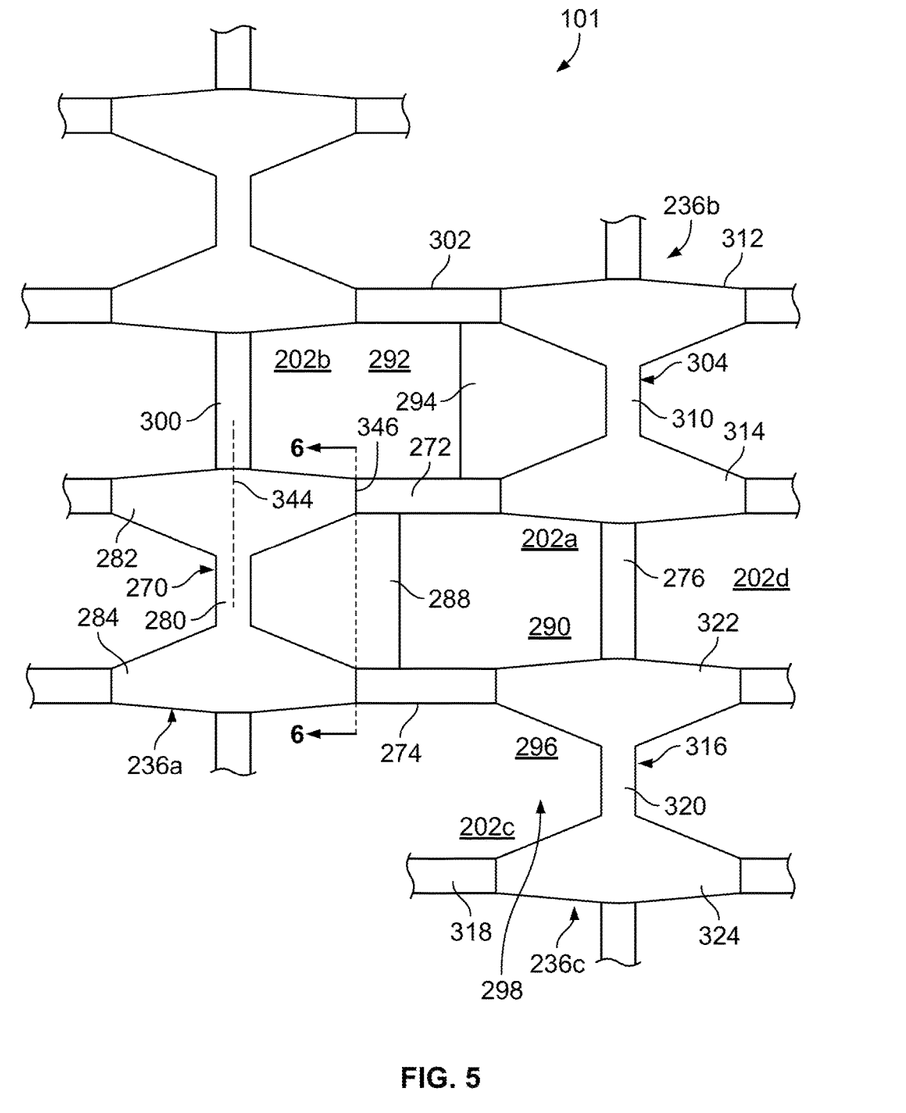
FIG. 5 is a top view of a plurality of electrowetting pixel regions of an example electrowetting display device with several electrowetting pixel regions in an activated state with a first fluid displaced within an associated electrowetting pixel by a second fluid, according to an example embodiment.
Figure 6:
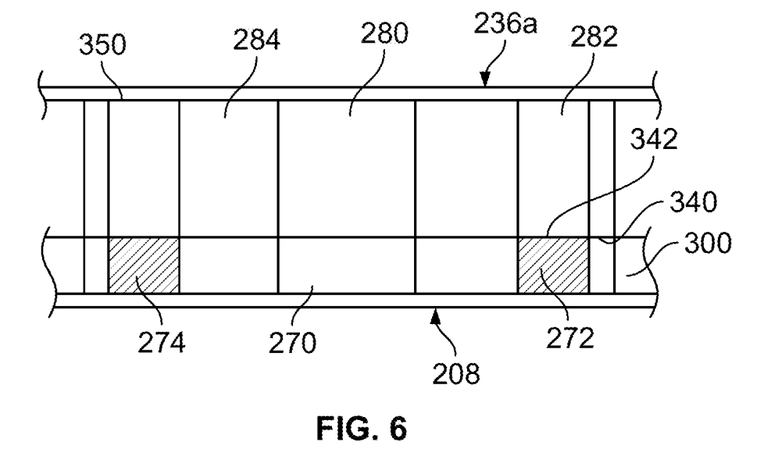
FIG. 6 is a cross-sectional view of an electrowetting pixel region of the example electrowetting display device of FIG. 5 along sectional line 6-6 without fluid in the electrowetting pixel region.

FIG. 5 shows a plurality of spacers coupled to the pixel walls of pixel grid 101 formed on bottom support plate 104. FIG. 6 is a cross-sectional view of an electrowetting pixel region of the example electrowetting display device of FIG. 5 along sectional line 6-6 without fluid in the electrowetting pixel region. While the spacers are shown in FIG. 5 in an alternating pattern along a width and/or a height of pixel grid 101, in alternative embodiments the spacers are coupled to the respective pixel walls of pixel grid 101 in any suitable pattern, orientation and/or configuration. Referring now to FIG. 5, in an alternative example embodiment, at least a portion of a pixel wall 208 on bottom support plate 104 is associated with one or more pixels 202; for example, an electrowetting pixel 202a and an electrowetting pixel 202b, or electrowetting pixel 202a and an electrowetting pixel 202c. A first segment 270 of pixel wall 208 is coupled between a second segment 272 of pixel wall 208 perpendicular to first segment 270 and a third segment 274 of pixel wall 208 perpendicular to first segment 270 and opposing second segment 272 and parallel to second segment 272. Pixel wall 208 also includes a fourth segment 276 opposing first segment 270 and parallel to first segment 270. Fourth segment 276 has a length extending between second segment 272 and third segment 274.

A first spacer 236a on top support plate 114 (not shown in FIG. 5 for clarity) extends toward pixel wall 208. Referring further to FIG. 6, in this embodiment, a contact surface of first spacer 236a is substantially identical to a contact surface of pixel wall 208, as described below. First spacer 236a includes a first portion 280 substantially contacting pixel wall 208 along a length of first segment 270. A second portion 282 of first spacer 236a is coupled to first portion 280 and substantially contacts second segment 272 along a first portion of a length of second segment 272 between first segment 270 and opposing fourth segment 276. A third portion 284 of first spacer 236a opposite second portion 282 is coupled to first portion 280 and substantially contacts third segment 274 along a first portion of a length of third segment 274 between first segment 270 and fourth segment 276. In this embodiment, first portion 280, second portion 282, and third portion 284 are coupled to pixel wall 208 to collectively provide an oil collection area 288 within an electrowetting pixel region 290 including electrowetting pixel 202a.

As shown in FIG. 5, a second spacer 236b on top support plate 114 extends toward pixel wall 208. Second spacer 236b substantially contacts pixel wall 208 along a second portion of second segment 272 and is separated by a distance from first spacer 236a along second segment 272 to provide fluid communication between electrowetting pixel region 290 and a first immediately adjacent electrowetting pixel region 292. Second spacer 236b is coupled to a portion of pixel wall 208 associated with electrowetting pixel 202b to provide an oil collection area 294 within first immediately adjacent electrowetting pixel region 292 including electrowetting pixel 202b. Similarly, a third spacer 236c on top support plate 114 extends toward pixel wall 208. Third spacer 236c substantially contacts pixel wall 208 along a second portion of third segment 274 and is separated by a distance from first spacer 236a along third segment 274 to provide fluid communication between electrowetting pixel region 290 and a second immediately adjacent electrowetting pixel region 296 including electrowetting pixel 202c. Third spacer 236c is coupled to a portion of pixel wall 208 associated with electrowetting pixel 202c to provide an oil collection area 298 within pixel region 296 including electrowetting pixel 202c.

At least a portion of pixel wall 208 on bottom support plate 104 is associated with electrowetting pixel 202b as shown in FIG. 5. More specifically, a fifth segment 300 of pixel wall 208 is coupled between a sixth segment 302 of pixel wall 208 perpendicular to fifth segment 300 and second segment 272 of pixel wall 208 opposing sixth segment 302 and parallel to sixth segment 302. Pixel wall 208 also includes a seventh segment 304 opposing fifth segment 300 and parallel to fifth segment 300. Seventh segment 304 has a length extending between sixth segment 302 and second segment 272. Second spacer 236b includes a first portion 310 that substantially contacts pixel wall 208 along the length of seventh segment 304. A second portion 312 of second spacer 236b is coupled to first portion 310 and substantially contacts sixth segment 302 along only a portion of the length of sixth segment 302. A third portion 314 of second spacer 236b is coupled to first portion 310 and substantially contacts second segment 272 along only a portion of the length of third segment 274. Third portion 314 of second spacer 236b is separated by a distance from second portion 282 of first spacer 236a along second segment 272 to provide fluid communication between electrowetting pixel region 290 and first immediately adjacent electrowetting pixel region 292. As shown in FIG. 5, in certain embodiments, at least a portion of second spacer 236b, e.g., third portion 314 extends slightly into pixel region 290.

Referring further to FIG. 5, at least a portion of pixel wall 208 on bottom support plate 104 is associated with electrowetting pixel 202c. More specifically, an eighth segment 316 of pixel wall 208 is coupled between third segment 274 of pixel wall 208 perpendicular to eighth segment 316 and a ninth segment 318 of pixel wall 208 opposing third segment 274 and parallel to third segment 274. Eighth segment 316 has a length extending between third segment 274 and ninth segment 318. Third spacer 236c includes a first portion 320 that contacts pixel wall 208 along substantially the length of eighth segment 316. A second portion 322 of third spacer 236c is coupled to first portion 320 and substantially contacts third segment 274 along only a portion of the length of third segment 274. A third portion 324 of third spacer 236c is coupled to first portion 320 and substantially contacts ninth segment 318 along only a portion of the length of ninth segment 318. Second portion 322 of third spacer 236c is separated by a distance from third portion 284 of first spacer 236a along third segment 274 to provide fluid communication between electrowetting pixel region 290 and second immediately adjacent electrowetting pixel region 296. Additionally, third spacer 236c is separated by a distance from second spacer 236b along fourth segment 276 to provide fluid communication between electrowetting pixel region 290 and a third immediately adjacent electrowetting pixel region 330 including electrowetting pixel 202d.

Referring further to FIG. 6, in certain embodiments, second portion 282 of first spacer 236a has a first planar contact surface 340 parallel to a surface of top support plate 114. First contact surface 340 contacts a corresponding second planar contact surface 342 on second segment 272 of pixel wall 208. In this embodiment, first contact surface 340 of first spacer 236a is substantially identical to second contact surface 342 of the portion of second segment 272 contacting first contact surface 340. First contact surface 340 at a midline 344 of second portion 282, shown in FIG. 5, has a first width and first contact surface 340 at a terminal end 346 of second portion 282, shown in FIG. 5, at a distance from midline 344 has a second width less than the first width. As shown in FIG. 6, planar surfaces of first spacer 236a are coplanar with complementary or corresponding planar surfaces of pixel wall 208. More specifically, planar surfaces of first portion 280 are coplanar with corresponding planar surfaces of first segment 270, planar surfaces of second portion 282 are coplanar with corresponding planar surfaces of second segment 272, and planar surfaces of third portion 284 are coplanar with corresponding planar surfaces of third segment 274. In an example alternative embodiment, second portion 282 has a base 350 coupled to top support plate 114 and opposing first contact surface 340 contacts second contact surface 342 of pixel wall 208. Base 250 has a first width and first contact surface 340 has a second width different from the first width; i.e., the second width is less than the first width or the second width is greater than the first width. The spacers, e.g., spacers 136a, 136b, 236a, 236b, and 236c, and the spacer portions as described herein may have any suitable configuration, shape, and/or dimensions. Moreover, the spacers, e.g., one or more spacer portions, may have a configuration, a shape, and/or one or more dimensions the same or similar to, or different from, a corresponding configuration, shape, and/or dimension of the pixel wall, e.g., pixel wall segment or segments, to which the spacer or spacer portion is coupled. For example, and without limitation, the spacers or portions of the spacers may have a rectangular, triangular, diamond, coffin, or any suitable polygonal shape. Further, the spacer portions may be symmetrical or asymmetrical and may be identical or different from the other spacer portions, e.g., an opposing side portion of the spacer.

Figure 7:
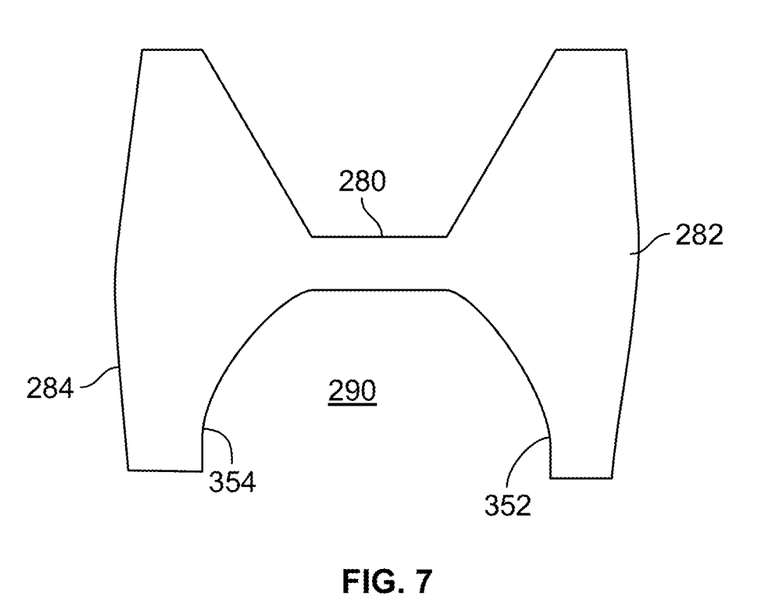
FIG. 7 is a top view of an alternative spacer, according to an example embodiment.

In a further embodiment, as shown in FIG. 7, second portion 282 has an arcuate sidewall 352 and third portion 284 has an arcuate sidewall 354 facing electrowetting pixel region. In this embodiment, corresponding second segment 272 and third segment 274 may also have arcuate sidewalls.

In an example embodiment, an electrowetting display device includes a first support plate and an opposing second support plate. A first liquid and a second liquid that is immiscible with the first liquid are disposed between the first support plate and the second support plate. A pixel wall is formed over or on the first support plate. The pixel wall forms a perimeter of an electrowetting pixel within an electrowetting pixel region. The pixel wall has a first segment, a second segment perpendicular to the first segment, a third segment perpendicular to the first segment and parallel to the second segment, and a fourth segment extending between the second segment and the third segment and being parallel to the first segment. The first segment extends between the second segment and the third segment. A first spacer is coupled to the second support plate. The first spacer includes a first portion contacting the pixel wall substantially along a length of the first segment. A second portion of the first spacer is coupled to the first portion and extends along only a first portion of a length of the second segment from the first segment toward the fourth segment, such that the second portion contacts the second segment. A third portion of the first spacer is coupled to the first portion and extends along only a first portion of a length of the third segment from the first segment toward the fourth segment, such that the third portion contacts the third segment. In an example embodiment, a second spacer is coupled to the second support plate. The second spacer contacts the pixel wall along only a second portion of the second segment. In this embodiment, the second spacer is separated by a distance from the first spacer along the second segment to provide fluid communication between the electrowetting pixel region and a first immediately adjacent electrowetting pixel region. Additionally, a third spacer is coupled to the second support plate. The third spacer contacts the pixel wall along only a second portion of the third segment. The third spacer is separated by a distance from the first spacer along the third segment to provide fluid communication between the electrowetting pixel region and a second immediately adjacent electrowetting pixel region. Further, in this example embodiment, the third spacer is separated by a distance from the second spacer along the fourth segment to provide fluid communication between the electrowetting pixel region and a third immediately adjacent electrowetting pixel region.

In an alternative embodiment, a second spacer is coupled to the second support plate. The second spacer includes a first portion that contacts the pixel wall substantially along a length of the fourth segment. A second portion of the second spacer is coupled to the first portion and contacts the second segment along only a second portion of a length of the second segment, such that the second portion of the second spacer is separated by a distance from the second portion of the first spacer along the second segment. A third portion of the second spacer is coupled to the first portion and contacts the third segment along only a second portion of a length of the third segment. The third portion of the second spacer is separated by a distance from the third portion of the first spacer along the third segment.

In an example embodiment, a display device includes a first support plate and an opposing second support plate. At least a portion of a wall on the first support plate is associated with a pixel within a pixel region. The wall has a first segment, a second segment perpendicular to the first segment, and a third segment perpendicular to the first segment and parallel to the second segment. A spacer on the second support plate extends toward the wall. The spacer includes a first portion that contacts the wall along a length of the first segment. A second portion of the spacer is coupled to the first portion and contacts the second segment along a first portion of a length of the second segment. A third portion of the spacer is coupled to the first portion and contacts the third segment along a first portion of a length of the third segment.

In another example embodiment, a pixel region is between a first support plate and a second support plate of an electrowetting display device. A pixel wall on the first support plate is associated with an electrowetting pixel within the pixel region. The pixel wall has a first segment, a second segment perpendicular to the first segment, a third segment perpendicular to first segment and parallel to the second segment. A fourth segment of the pixel wall opposing the first segment and parallel to the first segment is coupled between the second segment and the third segment. The first segment, the second segment, and the third segment collectively form a first contact surface. A spacer on the second support plate extends toward the pixel wall. The spacer has a second contact surface contacting the first contact surface. The spacer includes a first portion that contacts the pixel wall along a length of the first segment. A second portion of the spacer is coupled to the first portion and contacts the second segment along only a first portion of a length of the second segment, extending from the first segment toward the fourth segment. A third portion of the spacer is coupled to the first portion and contacts the third segment along only a first portion of a length of the third segment, extending from the first segment toward the fourth segment. In a particular embodiment, an additional spacer on the second support plate extends toward the pixel wall. The additional spacer substantially contacts the pixel wall along a portion of the second segment, such that the additional spacer is separated by a distance from the spacer along the second segment to provide fluid communication between the pixel region and a first immediately adjacent pixel region.

In an example embodiment, an electrowetting display device is fabricated. For example, the electrowetting display device may employ a pixel wall and spacer configuration such as that shown in FIG. 4A or FIG. 5. Though claimed subject matter is not limited in this respect, this method may be performed manually (e.g., by humans) and/or using automated equipment. A multilayer stack is first formed. In certain embodiments, the multilayer stack includes a first conductive layer deposited on a first support plate. In one embodiment, the first conductive layer is indium tin oxide (ITO), although in alternative embodiments the first conductive layer may be another suitable material. Deposition techniques include, for example, chemical vapor deposition (CVD), physical vapor deposition (PVD), molecular beam epitaxy (MBE), and sputtering. The first support plate may be the same as or similar to bottom support plate 104 shown in FIG. 1.

The multilayer stack includes a first dielectric layer deposited on the first conductive layer. The first dielectric layer may comprise SiN, SiON, SiO, or TaO, for example. Any suitable deposition technique may be used, such as CVD, PVD, MBE, and a sputtering, for example. A hydrophobic layer (e.g., hydrophobic layer 122, shown in FIG. 1) may be deposited over the patterned first dielectric layer.

A photoresist material is applied over a surface of a first support plate. In one embodiment, a photoresist material is deposited on a surface of a first support plate, e.g., on the multilayer stack, or on the hydrophobic layer. In certain embodiments, the photoresist material is an epoxy-based negative photoresist SU-8, although other suitable photoresist materials may be used in alternative embodiments. A diffractive mask is positioned over the first support plate. The diffractive mask includes a pattern of non-transparent material defining one or more openings through the diffractive mask. The one or more openings allow ultraviolet light to pass through the one or more openings to impinge on the photoresist material. The photoresist material is then controllably exposed to ultraviolet light using the diffractive mask to cure a portion of the photoresist material to form a patterned photoresist layer. The patterned photoresist layer is developed and uncured portions of the photoresist material are removed to form a pixel wall. In various embodiments, the process may include one or more positive and/or negative photoresist processing steps. In alternative embodiments, these structures may be printed using suitable methods other than photolithography, including, without limitation, direct writing and electron beam lithography (EBL).

To form the spacer, a photoresist material is deposited over a surface of a second support plate. A diffractive mask is positioned over the second support plate. The diffractive mask includes a pattern of non-transparent material defining one or more openings through the diffractive mask. The one or more openings allow ultraviolet light to pass through the one or more openings. The photoresist material is controllably patterned through the diffractive mask to cure a portion of the photoresist material to form a patterned photoresist layer. The patterned photoresist layer is developed to form a plurality of spacers.

After forming a plurality of pixel walls on the first support plate and forming a plurality of spacers on the second support plate, the distal end of each spacer portion is aligned to contact the distal end of a corresponding segment of the pixel wall to at least partially define electrowetting pixel regions and the second support plate is coupled to the first support plate.

Following formation of the pixel walls, a reflow process may be utilized to modify the hydrophobicity of the hydrophobic layer before an ultraviolet (UV) ozone process is utilized to make the pixel walls hydrophilic. The dosing used during the UV ozone processing is determined by the shape and size of the pixel walls. After UV ozone processing, the first and second liquids (e.g., the oil and electrolyte solution) can be disposed within the electrowetting pixel regions of the electrowetting display device.

Figure 8:
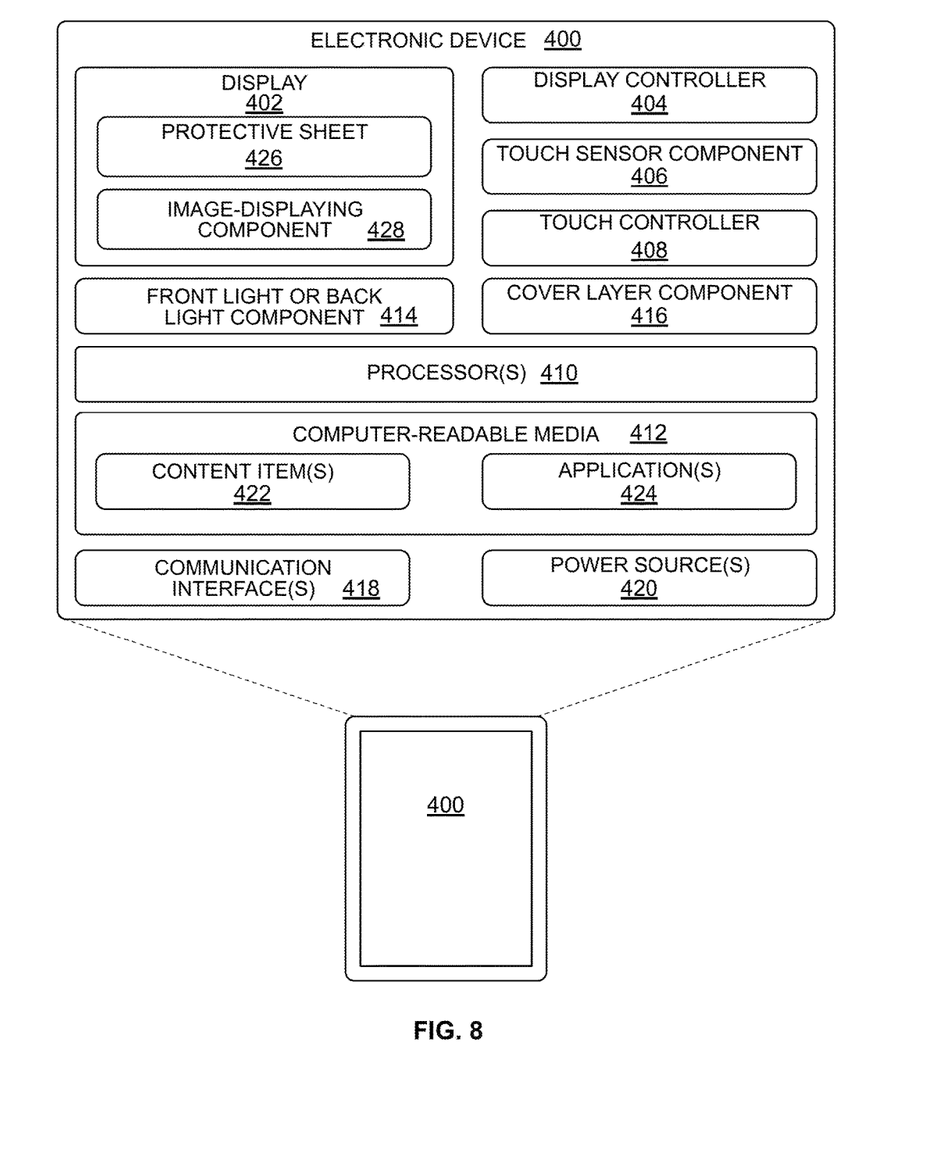
FIG. 8 illustrates an example electronic device that may incorporate an electrowetting display device, according to example embodiments.

FIG. 8 illustrates an example electrowetting display device 400 that may incorporate any of the display devices discussed above. Electrowetting display device 400 may comprise any type of electronic device having a display. For instance, electrowetting display device 400 may be a mobile electronic device (e.g., an electronic book reader, a tablet computing device, a laptop computer, a smart phone or other multifunction communication device, a portable digital assistant, a wearable computing device, or an automotive display). Alternatively, electrowetting display device 400 may be a non-mobile electronic device (e.g., a computer display or a television). In addition, while FIG. 8 illustrates several example components of electrowetting display device 400, it is to be appreciated that electrowetting display device 400 may also include other conventional components, such as an operating system, system busses, input/output components, and the like. Further, in other embodiments, such as in the case of a television or computer monitor, electrowetting display device 400 may only include a subset of the components illustrated.

Regardless of the specific implementation of electrowetting display device 400, electrowetting display device 400 includes a display 402 and a corresponding display controller 404. The display 402 may represent a reflective or transmissive display in some instances or, alternatively, a transflective display (partially transmissive and partially reflective).

In one embodiment, display 402 comprises an electrowetting display that employs an applied voltage to change the surface tension of a liquid in relation to a surface. For example, such an electrowetting display may include the array of pixel regions 101 illustrated in FIG. 1A, though claimed subject matter is not limited in this respect. By applying a voltage across a portion of an electrowetting pixel of an electrowetting display, wetting properties of a surface may be modified so that the surface becomes increasingly hydrophilic. As one example of an electrowetting display, the modification of the surface tension acts as an optical switch by displacing a colored oil film if a voltage is applied to individual pixels of the display. If the voltage is absent, the colored oil forms a continuous film within a pixel, and the color may thus be visible to a user. On the other hand, if the voltage is applied to the pixel, the colored oil is displaced and the pixel becomes transparent. If multiple pixels of the display are independently activated, display 402 may present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video or other animated content.

Of course, while several different examples have been given, it is to be appreciated that while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, display 402 may represent a backlit display, examples of which are mentioned above.

In addition to including display 402, FIG. 8 illustrates that some examples of electrowetting display device 400 may include a touch sensor component 406 and a touch controller 408. In some instances, at least one touch sensor component 406 resides with, or is stacked on, display 402 to form a touch-sensitive display. Thus, display 402 may be capable of both accepting user touch input and rendering content in response to or corresponding to the touch input. As several examples, touch sensor component 406 may comprise a capacitive touch sensor, a force sensitive resistance (FSR), an interpolating force sensitive resistance (IFSR) sensor, or any other type of touch sensor. In some instances, touch sensor component 406 is capable of detecting touches as well as determining an amount of pressure or force of these touches.

FIG. 8 further illustrates that electrowetting display device 400 may include one or more processors 410 and one or more computer-readable media 412, as well as a front light component 414 (which may alternatively be a backlight component in the case of a backlit display) for lighting display 402, a cover layer component 416, such as a cover glass or cover sheet, one or more communication interfaces 418 and one or more power sources 420. The communication interfaces 418 may support both wired and wireless connection to various networks, such as cellular networks, radio, WiFi networks, short range networks (e.g., Bluetooth®), and infrared (IR) networks, for example.

Depending on the configuration of electrowetting display device 400, computer-readable media 412 (and other computer-readable media described throughout) is an example of computer storage media and may include volatile and nonvolatile memory. Thus, computer-readable media 412 may include, without limitation, RAM, ROM, EEPROM, flash memory, and/or other memory technology, and/or any other suitable medium that may be used to store computer-readable instructions, programs, applications, media items, and/or data which may be accessed by electrowetting display device 400.

Computer-readable media 412 may be used to store any number of functional components that are executable on processor 410, as well as content items 422 and applications 424. Thus, computer-readable media 412 may include an operating system and a storage database to store one or more content items 422, such as eBooks, audio books, songs, videos, still images, and the like. Computer-readable media 412 of electrowetting display device 400 may also store one or more content presentation applications to render content items on electrowetting display device 400. These content presentation applications may be implemented as various applications 424 depending upon content items 422. For instance, the content presentation application may be an electronic book reader application for rending textual electronic books, an audio player for playing audio books or songs, or a video player for playing video.

In some instances, electrowetting display device 400 may couple to a cover (not illustrated in FIG. 8) to protect the display 402 (and other components in the display stack or display assembly) of electrowetting display device 400. In one example, the cover may include a back flap that covers a back portion of electrowetting display device 400 and a front flap that covers display 402 and the other components in the stack. Electrowetting display device 400 and/or the cover may include a sensor (e.g., a Hall effect sensor) to detect whether the cover is open (i.e., if the front flap is not atop display 402 and other components). The sensor may send a signal to front light component 414 if the cover is open and, in response, front light component 414 may illuminate display 402. If the cover is closed, meanwhile, front light component 414 may receive a signal indicating that the cover has closed and, in response, front light component 414 may turn off.

Furthermore, the amount of light emitted by front light component 414 may vary. For instance, upon a user opening the cover, the light from the front light may gradually increase to its full illumination. In some instances, electrowetting display device 400 includes an ambient light sensor (not illustrated in FIG. 8) and the amount of illumination of front light component 414 may be based at least in part on the amount of ambient light detected by the ambient light sensor. For example, front light component 414 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of display 402 may vary depending on whether front light component 414 is on or off, or based on the amount of light provided by front light component 414. For instance, electrowetting display device 400 may implement a larger default font or a greater contrast when the light is off compared to when the light is on. In some embodiments, electrowetting display device 400 maintains, if the light is on, a contrast ratio for display 402 that is within a certain defined percentage of the contrast ratio if the light is off As described above, touch sensor component 406 may comprise a capacitive touch sensor that resides atop display 402. In some examples, touch sensor component 406 may be formed on or integrated with cover layer component 416. In other examples, touch sensor component 406 may be a separate component in the stack of the display assembly. Front light component 414 may reside atop or below touch sensor component 406. In some instances, either touch sensor component 406 or front light component 414 is coupled to a top surface of a protective sheet 426 of display 402. As one example, front light component 414 may include a lightguide sheet and a light source (not illustrated in FIG. 8). The lightguide sheet may comprise a substrate (e.g., a transparent thermoplastic such as PMMA or other acrylic), a layer of lacquer and multiple grating elements formed in the layer of lacquer that function to propagate light from the light source towards display 402; thus, illuminating display 402.

Cover layer component 416 may include a transparent substrate or sheet having an outer layer that functions to reduce at least one of glare or reflection of ambient light incident on electrowetting display device 400. In some instances, cover layer component 416 may comprise a hard-coated polyester and/or polycarbonate film, including a base polyester or a polycarbonate that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3 h pencil). Without such scratch resistance, a device may be more easily scratched and a user may perceive the scratches from the light that is dispersed over the top of the reflective display. In some examples, protective sheet 426 may include a similar UV-cured hard coating on the outer surface. Cover layer component 416 may couple to another component or to protective sheet 426 of display 402. Cover layer component 416 may, in some instances, also include a UV filter, a UV-absorbing dye, or the like, for protecting components lower in the stack from UV light incident on electrowetting display device 400. In still other examples, cover layer component 416 may include a sheet of high-strength glass having an antiglare and/or antireflective coating.

Display 402 includes protective sheet 426 overlying an image-displaying component 428. For example, display 402 may be preassembled to have protective sheet 426 as an outer surface on the upper or image-viewing side of display 402. Accordingly, protective sheet 426 may be integral with and may overlay image-displaying component 428. Protective sheet 426 may be optically transparent to enable a user to view, through protective sheet 426, an image presented on image-displaying component 428 of display 402.

In some examples, protective sheet 426 may be a transparent polymer film in the range of 25 to 200 micrometers in thickness. As several examples, protective sheet 426 may be a transparent polyester, such as polyethylene terephthalate (PET) or polyethylene naphthalate (PEN), or other suitable transparent polymer film or sheet, such as a polycarbonate or an acrylic. In some examples, the outer surface of protective sheet 426 may include a coating, such as the hard coating described above. For instance, the hard coating may be applied to the outer surface of protective sheet 426 before or after assembly of protective sheet 426 with image-displaying component 428 of display 402. In some examples, the hard coating may include a photoinitiator or other reactive species in its composition, such as for curing the hard coating on protective sheet 426. Furthermore, in some examples, protective sheet 426 may be dyed with a UV-light-absorbing dye, or may be treated with other UV-absorbing treatment. For example, protective sheet 426 may be treated to have a specified UV cutoff such that UV light below a cutoff or threshold wavelength is at least partially absorbed by protective sheet 426, thereby protecting image-displaying component 428 from UV light.

According to some embodiments herein, one or more of the components discussed above may be coupled to display 402 using fluid optically-clear adhesive (LOCA). For example, the light guide portion of front light component 414 may be coupled to display 402 by placing LOCA on the outer or upper surface of protective sheet 426. If the LOCA reaches the corner(s) and/or at least a portion of the perimeter of protective sheet 426, UV-curing may be performed on the LOCA at the corners and/or the portion of the perimeter. Thereafter, the remaining LOCA may be UV-cured and front light component 414 may be coupled to the LOCA. By first curing the corner(s) and/or the perimeter, the techniques effectively create a barrier for the remaining LOCA and also prevent the formation of air gaps in the LOCA layer, thereby increasing the efficacy of front light component 414. In other embodiments, the LOCA may be placed near a center of protective sheet 426, and pressed outwards towards a perimeter of the top surface of protective sheet 426 by placing front light component 414 on top of the LOCA. The LOCA may then be cured by directing UV light through front light component 414. As discussed above, and as discussed additionally below, various techniques, such as surface treatment of the protective sheet, may be used to prevent discoloration of the LOCA and/or protective sheet 426.

While FIG. 8 illustrates a few example components, electrowetting display device 400 may have additional features or functionality. For example, electrowetting display device 400 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within electrowetting display device 400 may reside remotely from electrowetting display device 400 in some implementations. In these implementations, electrowetting display device 400 may utilize communication interfaces 418 to communicate with and utilize this functionality.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. An electrowetting display device, comprising:
a first support plate and an opposing second support plate;
a first liquid and a second liquid that is immiscible with the first liquid, the first liquid and the second liquid disposed between the first support plate and the second support plate;
a pixel wall formed on the first support plate, the pixel wall forming a perimeter of an electrowetting pixel within an electrowetting pixel region, the pixel wall having a first segment, a second segment perpendicular to the first segment, a third segment perpendicular to the first segment and parallel to the second segment, and a fourth segment extending between the second segment and the third segment and being parallel to the first segment, wherein the first segment extends between the second segment and the third segment; and
a first spacer coupled to the second support plate, the first spacer comprising:
a first portion contacting the pixel wall substantially along a length of the first segment;
a second portion coupled to the first portion and extending along a first portion of the second segment from the first segment toward the fourth segment, the second portion contacting the second segment; and
a third portion coupled to the first portion and extending along a first portion of the third segment from the first segment toward the fourth segment, the third portion contacting the third segment.

2. The electrowetting display device of claim 1, further comprising:
a second spacer coupled to the second support plate, the second spacer contacting the pixel wall along a second portion of the second segment, the second spacer separated by a distance from the first spacer along the second segment to provide fluid communication between the electrowetting pixel region and a first immediately adjacent electrowetting pixel region; and
a third spacer coupled to the second support plate, the third spacer contacting the pixel wall along a second portion of the third segment, the third spacer separated by a distance from the first spacer along the third segment to provide fluid communication between the electrowetting pixel region and a second immediately adjacent electrowetting pixel region, wherein the third spacer is separated by a distance from the second spacer along the fourth segment to provide fluid communication between the electrowetting pixel region and a third immediately adjacent electrowetting pixel region.

3. The electrowetting display device of claim 1, further comprising:
a second spacer coupled to the second support plate, the second spacer comprising:
a first portion contacting the pixel wall substantially along a length of the fourth segment;
a second portion coupled to the first portion and contacting the second segment along a second portion of the second segment, the second portion of the second spacer separated by a distance from the second portion of the first spacer along the second segment; and
a third portion coupled to the first portion and contacting the third segment along a second portion of the third segment, the third portion of the second spacer separated by a distance from the third portion of the first spacer along the third segment.

4. A display device, comprising:
a first support plate and an opposing second support plate;
a wall on the first support plate, at least a portion of the wall associated with a pixel within a pixel region, the wall having a first segment, a second segment perpendicular to the first segment, and a third segment perpendicular to the first segment and parallel to the second segment; and
a first spacer on the second support plate and extending toward the wall, the first spacer comprising:
a first portion contacting the wall along a length of the first segment;
a second portion coupled to the first portion and contacting the second segment along a first portion of the second segment; and
a third portion coupled to the first portion and contacting the third segment along a first portion of the third segment.

5. The display device of claim 4, wherein the wall comprises a fourth segment opposing the first segment and parallel to the first segment, the fourth segment extending between the second segment and the third segment, the display device further comprising a second spacer on the second support plate and extending toward the wall, the second spacer coupled to the fourth segment and at a distance from the first spacer to provide fluid communication between the pixel region and an immediately adjacent pixel region.

6. The display device of claim 5, wherein the second spacer comprises:
a first portion contacting the wall along the length of the fourth segment;
a second portion coupled to the first portion and contacting the second segment along a second portion of the second segment, the second portion of the second spacer separated by a distance from the second portion of the first spacer along the second segment; and
a third portion coupled to the first portion and contacting the third segment along a second portion of the third segment, the third portion of the second spacer separated by a distance from the third portion of the first spacer along the third segment.

7. The display device of claim 4, further comprising an oil collection area, the oil collection area at least partially defined by the first portion, the second portion, and the third portion each coupled to the wall within the pixel region.

8. The display device of claim 4, further comprising a second spacer on the second support plate and extending toward the wall, the second spacer contacting the wall along a second portion of the second segment, the second spacer separated by a distance from the first spacer along the second segment.

9. The display device of claim 8, wherein the second spacer is coupled to a portion of the wall associated with the first immediately adjacent pixel region, the display device further comprising a first oil collection area within the pixel region at least partially defined by the first spacer and the wall and a second oil collection area within the first immediately adjacent pixel region at least partially defined by the second spacer and the wall.

10. The display device of claim 8, further comprising a third spacer on the second support plate and extending toward the wall, the third spacer contacting the wall along a second portion of the third segment, the third spacer separated by a distance from the first spacer along the third segment.

11. The display device of claim 10, wherein the wall comprises a fourth segment opposing the first segment and parallel to the first segment, the fourth segment extending between the second segment and the third segment, and the third spacer is separated by a distance from the second spacer along the fourth segment.

12. The display device of claim 4, wherein the second portion has a contact surface parallel to a surface of the second support plate, the contact surface contacting a portion of the second segment, the contact surface having a midline and a terminal end at a distance from the midline, the contact surface having a first width at the midline and a second width at the terminal end less than the first width.

13. The display device of claim 4, wherein the second portion has a base coupled to a surface of the second support plate and a contact surface at a distance from the surface of the second support plate, the contact surface contacting the wall, the second portion having a first width at the base and a second width at the contact surface different from the first width.

14. The display device of claim 13, wherein the second width is less than the first width.

15. The display device of claim 4, wherein the first spacer has a contact surface contacting a contact surface of the wall, the contact surface of the first spacer having a surface area substantially identical to a surface area of the contact surface of the wall.

16. The display device of claim 4, wherein each of the second portion and the third portion have an arcuate sidewall facing the pixel region.

17. The display device of claim 4, wherein the second portion has a first contact surface at a distance from the second support plate and a first sidewall extending from the first support plate perpendicular to the first contact surface, and the second segment has a second contact surface at a distance from the first support plate and a second sidewall extending from the second support plate perpendicular to the second contact surface, and the first sidewall is coplanar with the second sidewall.

18. A display device, comprising:
a first support plate and an opposing second support plate;
a pixel region between the first support plate and the second support plate, the pixel region comprising:
a wall on the first support plate, the wall associated with a pixel within the pixel region, the wall having a first segment, a second segment perpendicular to the first segment, a third segment perpendicular to the first segment and parallel to the second segment, and a fourth segment extending between the second segment and the third segment and being parallel to the first segment; and
a spacer on the second support plate and extending toward the wall, the spacer contacting the first segment, the second segment, and the third segment, wherein the spacer comprises:
a first portion contacting the wall along a length of the first segment;
a second portion coupled to the first portion, the second portion contacting the second segment along a first portion of the second segment and extending from the first segment toward the fourth segment; and
a third portion coupled to the first portion, the third portion contacting the third segment along a first portion of the third segment and extending from the first segment toward the fourth segment.

19. The display device of claim 18, wherein the first contact surface has a first surface area and the second contact surface has a second surface area substantially identical to the first surface area.

20. The electrowetting display device of claim 18, further comprising an additional spacer on the second support plate and extending toward the wall, the additional spacer substantially contacting the wall along a second portion of the second segment, the additional spacer separated by a distance from the spacer along the second segment.

* * * * *